(12) United States Patent
Kainan (10) Patent No.: US 11,826,956 B2
(45) Date of Patent: Nov. 28, 2023

(54) SYSTEM AND METHOD FOR PROVIDING THREE-DIMENSIONAL FEATURES ON LARGE FORMAT PRINT PRODUCTS

(71) Applicant: Kana Holdings, LLC, San Ysidro, CA (US)

(72) Inventor: Eran Asher Kainan, Netanya (IL)

(*) Notice: Subject to any disclaimer, the term of this patent is extended or adjusted under 35 U.S.C. 154(b) by 0 days.

(21) Appl. No.: 17/062,569

(22) Filed: Oct. 3, 2020

(65) Prior Publication Data

US 2021/0101338 A1 Apr. 8, 2021

Related U.S. Application Data

(60) Provisional application No. 62/911,041, filed on Oct. 4, 2019.

(51) Int. Cl.
| | |
|---|---|
| *B29C 64/209* | (2017.01) |
| *B29C 64/112* | (2017.01) |
| *B33Y 40/20* | (2020.01) |
| *B29C 64/245* | (2017.01) |
| *B29C 64/30* | (2017.01) |
| *B33Y 10/00* | (2015.01) |
| *B33Y 30/00* | (2015.01) |
| *B29C 64/295* | (2017.01) |

(52) U.S. Cl.
CPC .......... *B29C 64/209* (2017.08); *B29C 64/112* (2017.08); *B29C 64/245* (2017.08); *B29C 64/295* (2017.08); *B29C 64/30* (2017.08); *B33Y 10/00* (2014.12); *B33Y 30/00* (2014.12); *B33Y 40/20* (2020.01)

(58) Field of Classification Search
CPC ... B29C 64/112; B29C 64/209; B29C 64/245; B33Y 10/00; B33Y 30/00
See application file for complete search history.

(56) References Cited

U.S. PATENT DOCUMENTS

| | | |
|---|---|---|
| 6,131,498 A | 10/2000 | Gerber |
| 6,201,256 B1 | 3/2001 | Kouchi |
| 6,619,168 B2 | 9/2003 | Alsten |
| 6,672,187 B2 | 1/2004 | Alsten |
| 7,329,114 B2 | 2/2008 | Harper |
| 7,694,855 B2 | 4/2010 | Chastine |

(Continued)

FOREIGN PATENT DOCUMENTS

| | | |
|---|---|---|
| CN | 201353794 B2 | 12/2009 |
| CN | 201501167 A1 | 6/2010 |

(Continued)

OTHER PUBLICATIONS

International Application No. PCT/US2020/054180; Search Report.

(Continued)

*Primary Examiner* — Joseph S Del Sole
*Assistant Examiner* — Jamel M Nelson
(74) *Attorney, Agent, or Firm* — TMB Law; Timothy M. Brown (57) ABSTRACT

The invention provides a system and method for producing large format print products having three-dimensional features. The system incorporates at least one micro-dispensing jet valve and optionally a cutting apparatus to provide an integrated, efficient printing system capable of producing large format print products having dramatic three-dimensional features.

20 Claims, 3 Drawing Sheets

(56) References Cited

U.S. PATENT DOCUMENTS

| | | |
|---|---|---|
| 7,789,484 B2 | 9/2010 | Takada |
| 7,806,493 B2 | 10/2010 | Gazeau |
| 9,011,136 B1 | 4/2015 | Uzan |
| 9,189,712 B1 | 11/2015 | Grinberg |
| 9,216,543 B1 | 12/2015 | Lisitsin |
| 9,279,058 B2 | 3/2016 | Pervan |
| 2005/0247173 A1* | 11/2005 | Alsten .................. B26D 7/20 83/365 |
| 2010/0212821 A1 | 8/2010 | Grinberg |
| 2011/0219974 A1 | 12/2011 | Grinberg |
| 2012/0121308 A1 | 5/2012 | Higuchi |
| 2013/0070307 A1 | 3/2013 | Barnoy |
| 2014/0199495 A1* | 7/2014 | Pervan .................. B41J 2/325 427/256 |
| 2014/0291358 A1 | 10/2014 | Fliess |
| 2017/0369731 A1* | 12/2017 | Lisitsin ............ C09D 135/02 |
| 2018/0001558 A1 | 1/2018 | Taff |
| 2018/0029399 A1 | 2/2018 | Franzke |
| 2018/0043611 A1 | 2/2018 | Taff |
| 2018/0147776 A1* | 5/2018 | Kotani ................ B33Y 70/00 |

FOREIGN PATENT DOCUMENTS

| | | |
|---|---|---|
| EP | 0598182 A1 | 5/1994 |
| EP | 2455184 B1 | 5/2012 |
| EP | 2516169 B1 | 10/2012 |
| EP | 2844493 B1 | 7/2016 |
| FR | 2940627 A1 | 7/2010 |
| JP | 201753385 A1 | 11/2017 |
| WO | WO200510827 A1 | 11/2005 |
| WO | WO2011077200 A1 | 6/2011 |
| WO | 2016112216 A1 | 7/2016 |
| WO | WO-2016112216 A1 * | 7/2016 ............ B41J 11/002 |
| WO | WO2018012014 A1 | 1/2018 |

OTHER PUBLICATIONS

International Application No. PCT/US2020/054180; Written Opinion.
Ruz-Nuglo et al.; Adv. Eng. Mater. 2018, 20, 1700390.
Sun et al.; Microsyst. Technol. (2009) 15:1437-1448.
Holland et al.: Food Biophysics (2018) 13:175-185.
Vermes Microdispensing product brochure; MDS 3250 Series.
Pico Pulse Jet Valve System product brochure.
Vermes Microdispensing product brochure; MDS 3280 Series.

* cited by examiner

SYSTEM AND METHOD FOR PROVIDING THREE-DIMENSIONAL FEATURES ON LARGE FORMAT PRINT PRODUCTS

CROSS-REFERENCE TO RELATED APPLICATIONS

This application claims the benefit of U.S. Provisional Application No. 62/911,041, filed Oct. 4, 2019, the entire contents of which are incorporated herein by reference for all purposes.

FIELD OF THE INVENTION

The invention generally relates to the printing industry. More particularly, the invention relates to providing print products having three-dimensional features.

BACKGROUND

There exists a growing demand to increase the impact of large format print products by providing them with dramatic three-dimensional features, such as raised font, artistic features, glitter, and the like. Current market solutions for meeting this need suffer several limitations. For example, existing inkjet print heads for providing three-dimensional features must make several passes in order to achieve a desired level of height and in an effort to produce dramatic three-dimensional features. This compromises the efficiency of the printing process and product output as more time is required to make multiple printing passes. Another limitation of inkjet printer heads is they are incapable of dispensing viscous materials which can provide significantly raised three-dimensional features. Yet another limitation of existing inkjet systems for large format printing is that they do not allow three-dimensional features to be applied to pre-printed products. While the printing industry produces printed products with three-dimensional features by hand, this process suffers the same limitations of multiple-pass printing as it is inefficient and is limited in the quality of the three-dimensional features that it provides.

Existing systems for providing print products with three-dimensional features are also deficient in that they are not configured to process large format print products, such as banners and signs. Additionally, large format printing systems lack an integrated cutting and creasing function. Thus, large format printed products made using these systems must be manually cut and creased, or cut and creased using a separate machine, leading to a decrease in the efficiency and product output.

What is needed in the art therefore is a printing system and method capable of providing print products, including large format print products, with dramatic three-dimensional features in a single pass. The art also needs a system and method that integrates a cutting and creasing function in the processing of large format print jobs.

SUMMARY OF THE INVENTION

The invention overcomes the deficiencies of known three-dimensional printing devices and methods by providing a system comprising a micro-dispensing jet valve capable of efficiently producing three-dimensional features in a single-pass print process. The system and method can feature a cutting and creasing function for the integrated processing of large-format print products.

A first object of the invention is to provide a system for making a print product having at least one three-dimensional feature, comprising: a table adapted to receive a large format printable substrate; and at least material dispensing module in operable communication with the table in a manner that permits the material dispensing module to dispense a material onto a large format printable substrate that is loaded onto the table.

In some aspects, the material dispensing module includes at least one micro-dispensing jet valve.

In some aspects, the micro-dispensing jet valve is adapted to dispense droplets that are between about 0.5 nl and about 5,000 nl in size.

In some aspects, the micro-dispensing jet valve is adapted to dispense a material having a viscosity of at least 150 millipascal seconds.

In some aspects, the micro-dispensing jet valve comprises a nozzle with a dispensing orifice that is between about 50 microns and about 600 microns in diameter.

In some aspects, the material dispensing module comprises a heating element and at least one of a nozzle and a reservoir, wherein the heating element is adapted to heat at least one of the nozzle and the reservoir.

In some aspects, system comprises a plurality of material dispensing modules.

In some aspects, the system further comprises a cutting tool, a creasing tool, a camera adapted to detect at least one registration mark on a large format printable substrate, a UV curing module, or combinations thereof.

In some aspects, the cutting tool is a blade, die, rotary knife, angle cutter, laser cutter, oscillating tool, or router.

In some aspects, the cutting tool is adapted to kiss cut a large format printable substrate.

In some aspects, the system further comprises a bridge, wherein the bridge is adapted to traverse at least a portion of the table and the bridge is connected to the at least one material dispensing module, the cutting tool, the creasing tool, the camera, the UV curing module, or combinations thereof.

A second object of the invention is to provide a method of making a large format print product having at least one three-dimensional feature, comprising: providing a system comprising at least one material dispensing module; and providing a large format printable substrate; dispensing a material onto the large format printable substrate by the material dispensing module thereby providing a large format print product having at least one three-dimensional feature thereon.

In some aspects, the material permanently adheres to the large format printable substrate.

In some aspects, the material dispensing module includes at least one micro-dispensing jet valve.

In some aspects, the micro-dispensing jet valve dispenses the material as droplets that are between about 0.5 nl and about 5,000 nl in size.

In some aspects, the material is dispensed at a viscosity of at least about 150 millipascal seconds.

In some aspects, the micro-dispensing jet valve comprises a nozzle having dispensing orifice that is between about 50 microns and about 600 microns in diameter.

In some aspects, the material dispensing module comprises a heating element and at least one of a nozzle and a reservoir, wherein the heating element heats at least one of the nozzle and the reservoir, thereby decreasing the viscosity of the material dispensed by the material dispensing module.

In some aspects, the system comprises a plurality of material dispensing modules and the dispensing step comprises dispensing the same or different materials onto the large format printable substrate by the plurality of material dispensing modules.

In some aspects, the system comprises a cutting tool and the system cuts the large format printable substrate.

In some aspects, the system comprises a creasing tool and the creasing tool creases the large format printable substrate.

In some aspects, the material is selected from an adhesive, a UV curable material, or combination thereof.

In some aspects, the UV curable material is selected from a polyether, a polyurethane, an acryl, an epoxide, an epoxy, a silicone, a polyester, and combinations thereof.

In some aspects, the acryl is selected from an acrylic monomer, an acrylic oligomer, and combination thereof.

In some aspects, the acryl is selected from a monofunctional acryl, a difunctional acryl, a trifunctional acryl, a polyfunctional acryl, and combinations thereof.

In some aspects, the material is combined with a reactive diluent, a UV sensitive photoinitiator, a rheology modifier, an epoxy catalyst, an adhesive, glitter, plastic particles, glass particles, metallic particles, color pigment, phosphorescent powder, or combinations thereof.

In some aspects, the material dispensing module dispenses a UV curable material onto the large format printable substrate, the system comprises a UV curing module, and the UV curing module cures the dispensed UV curable material.

In some aspects, the printable substrate is selected from fabric, foam, cardboard, paper, glass, fiberglass, plastic, corrugated carton, wood, metal, acrylic, pvc, vinyl, and combinations thereof.

In some aspects, the large format printable substrate has printed matter thereon and the material is dispensed onto at least a portion of the printed matter thereby providing the portion with at least one three-dimensional feature.

In some aspects, the three-dimensional feature includes at least one domed feature.

In some aspects, the three-dimensional feature is between about 0.02 inches to about 5 inches in height as measured from the surface of the large format print product.

A third object of the invention is to provide a system for making a print product having at least one three-dimensional feature, comprising: a table adapted to receive a printable substrate and move the printable substrate along an x-axis with respect to the table; a bridge traversing the table along a y-axis with respect to the table; a carriage connected to the bridge, wherein the carriage is adapted to navigate the bridge and comprises carriage elements including: a cutting tool; a camera adapted to detect at least one registration mark on the printable substrate; a UV curing module; and a material dispensing module; and one or more processors in electronic communication with one or more of the table, the carriage, and at least one of the carriage elements; wherein at least one of the UV curing module and the material dispensing module are adapted to navigate a z-axis with respect to the table.

In some aspects, the table is adapted to receive a large format printable substrate.

In some aspects, the material dispensing module comprises at least one of a nozzle, a reservoir, a heating element, and a controller, wherein the element is adapted to heat at least one of the nozzle and the reservoir.

In some aspects, the carriage comprises a plurality of material dispensing modules.

In some aspects, the material dispensing module is adapted to produce at least one three-dimensional feature on the printable substrate.

In some aspects, the material dispensing module is adapted to produce one or more domed features on the printable substrate.

In some aspects, the material dispensing module is adapted to produce a three-dimensional feature on the print product that is between about 0.02 inches to about 5 inches in height as measured from the surface of the print product.

In some aspects, the material dispensing module is a micro-dispensing jet valve.

In some aspects, the micro-dispensing jet valve is adapted to dispense droplets having a size between about 0.5 nl and about 5000 nl.

In some aspects, micro-dispensing jet valve is adapted to dispense a material having a viscosity of at least 150 millipascal seconds.

In some aspects, the micro-dispensing jet valve comprises a nozzle having an orifice that is between about 50 microns and about 600 microns in diameter.

In some aspects, the cutting tool is a blade, die, rotary knife, angle cutter, laser cutter, oscillating tool, or router.

In some aspects, the cutting tool is adapted to kiss cut the printable substrate.

In some aspects, the carriage elements include a creasing tool.

In some aspects, the material dispensing module is adapted to dispense onto the printable substrate an adhesive, a UV curable material, glitter, glass particles, plastic particles, metallic particles, a phosphorescent powder, or combinations thereof.

In some aspects, the UV curable material is selected from a polyether, a polyurethane, an acryl, an epoxide, an epoxy, a silicone, a polyester, and combinations thereof.

In some aspects, the acryl is selected from an acrylic monomer, an acrylic oligomer, and combination thereof.

In some aspects, the acryl is selected from a monofunctional acryl, a difunctional acryl, a trifunctional acryl, a polyfunctional acryl, and combinations thereof.

In some aspects, the UV curable material is combined with a reactive diluent, a UV sensitive photoinitiator, a rheology modifier, or combinations thereof.

In some aspects, the system further comprises a computer readable medium having a program thereon, wherein the program is adapted to read at least one image file and permit the one or more processors to generate instructions for the system to: (i) cut the printable substrate according to a cutting pattern, (ii) crease the printable substrate according to a creasing pattern, (iii) dispense a UV curable material from the material dispensing module to produce at least one three-dimensional feature on the printable substrate according to a dispensing pattern; or (iv) combinations thereof.

In some aspects, the dispensing pattern includes instructions for illuminating the UV curable material with UV light by the UV curing module as the UV curable material dispensing module dispenses the UV curable material.

In some aspects, the table comprises a belt or rollers that are adapted to move the printable substrate along the x-axis of the table.

A fourth object of the invention is to provide a method of making a print product having at least one three-dimensional feature, comprising: providing a system comprising: (i) a table adapted to receive a printable substrate and move the printable substrate along an x-axis with respect to the table; (ii) a bridge traversing the table along a y-axis with respect to the table; (iii) a carriage adapted to navigate the bridge, wherein the carriage is connected to a cutting tool, a camera, a UV curing module, and at least one material dispensing module wherein at least one of the material dispensing module and the UV curing module are adapted to navigate a z-axis with respect to the table; and (iv) a processor; placing on the table a printable substrate having at least one registration mark; and executing instructions by the processor to: (i) move the printable substrate by the table along the x-axis and move the carriage on the bridge along the y-axis thereby permitting the camera to detect the registration mark; (ii) cut the printable substrate by the cutting tool according to a first pattern and the registration mark; (iii) dispense a first one or more layers of at least one UV curable material onto the printable substrate by the material dispensing module according to a second pattern and the registration mark; and (iv) illuminate the first one or more layers of the dispensed UV curable material with UV light by the UV curing module; wherein executing the instructions provides a print product that is cut according to the first pattern and has at least one three-dimensional feature according to the second pattern.

In some aspects, the printable substrate is a large format printable substrate.

In some aspects, executing the instructions (i) moves at least one of the material dispensing module and the curing module along the z-axis, (ii) dispenses a second one or more layers of the UV curable material by the material dispensing module, and (iii) illuminates the second one or more layers by the curing module.

In some aspects, the material dispensing module comprises a heating element and at least one of nozzle and a reservoir, wherein the heating element is adapted to heat at least one of the nozzle and the reservoir.

In some aspects, the carriage is connected to a plurality of material dispensing modules.

In some aspects, the material dispensing module is a micro-dispensing jet valve.

In some aspects, the micro-dispensing jet valve dispenses the UV curable material in droplets having a size of between about 0.5 nl and about 5000 nl.

In some aspects, the dispensed UV curable material has a viscosity of at least 150 millipascal seconds.

In some aspects, the micro-dispensing jet valve comprises a nozzle with an orifice between about 50 microns and about 600 microns in diameter.

In some aspects, the cutting tool is a blade, die, rotary knife, angle cutter, laser cutter, oscillating tool, or router.

In some aspects, the cutting tool produces a kiss cut on the printable substrate.

In some aspects, the system further comprises a creasing tool and executing the instructions includes executing instructions to crease the printable substrate by the creasing tool.

In some aspects, the three-dimensional feature includes one or more domed features.

In some aspects, the three-dimensional feature has a height between about 0.02 inches to about 5 inches as measured from the surface of the printable substrate.

In some aspects, the system comprises a plurality of material dispensing modules, and dispensing the first one or more layers comprises dispensing a plurality of UV curable materials.

In some aspects, the UV curable material is combined with an adhesive, glitter, plastic particles, glass particles, metallic particles, color pigment, phosphorescent powder, or combinations thereof.

In some aspects, the UV curable material is selected from a polyether, a polyurethane, an acryl, an epoxide, an epoxy, a silicone, a polyester, and combinations thereof.

In some aspects, the acryl is selected from an acrylic monomer, an acrylic oligomer, or combination thereof.

In some aspects, the acryl is selected from a monofunctional acryl, a difunctional acryl, a trifunctional acryl, a polyfunctional acryl, or combinations thereof.

In some aspects, the UV curable material is combined with a reactive diluent, a UV sensitive photoinitiator, a rheology modifier, or combinations thereof.

In some aspects, the UV curing module illuminates the UV curable material as the UV curable material is dispensed by the material dispensing module.

In some aspects, the table comprises a conveyor belt or rollers and the printable substrate is moved along the x-axis by the conveyor belt or the rollers.

In some aspects, printable substrate has printed matter thereon and the material dispensing module dispenses the UV curable material onto at least a portion of the printed matter thereby providing the portion with at least one three-dimensional feature.

In some aspects, the instructions are obtained from a computer readable medium that is accessed by the system.

These and other objects of the invention will be apparent to one skilled in the art in view of the following disclosure. The drawings and specific descriptions of the drawings, as well as any specific or alternative embodiments discussed, are intended to be read in conjunction with the entirety of this disclosure. The inventive system and method may, however, be embodied in many different forms and should not be construed as being limited to the embodiments set forth herein.

DEFINITIONS

As used herein, the term "about" means the quantity, level, value, number, frequency, percentage, dimension, size, amount, weight or length that is referenced, or that varies (plus or minus) by as much as 30%, 25%, 20%, 15%, 10%, 9%, 8%, 7%, 6%, 5%, 4%, 3%, 2% or 1% of the referenced quantity, level, value, number, frequency, percentage, dimension, size, amount, weight or length.

As used herein, the phrase "large format print product" refers to a printable media having a length, width, circumference, or other dimension that is at least 18 inches and which printable has been processed according to the system or method of the invention.

As used herein, the phrase "large format printable substrate" refers to a printable media having a length, width, circumference, or other dimension that is at least 18 inches and which printable media is acted upon by the system and method of the invention.

As used herein, the phrases "permanently adhere," "permanently adhered," and the like, can refer to a connection between two substances (e.g. a printable substrate and three-dimensional feature thereon) that cannot be broken by physical force without damaging the physical integrity of either substance, such as damage in the nature of tearing, cracking, denting, or shattering.

DETAILED DESCRIPTION

The invention generally relates to a system and method for providing three-dimensional features on print products. More particularly, the invention provides a system and method featuring a micro-dispensing jet valve adapted to dispense a material in a manner that provides significantly raised three-dimensional features on print products, including, without limitation, large format print products. The system can optionally include at least one of a cutting function and a creasing function to provide an integrated printing process.

Figure 1:
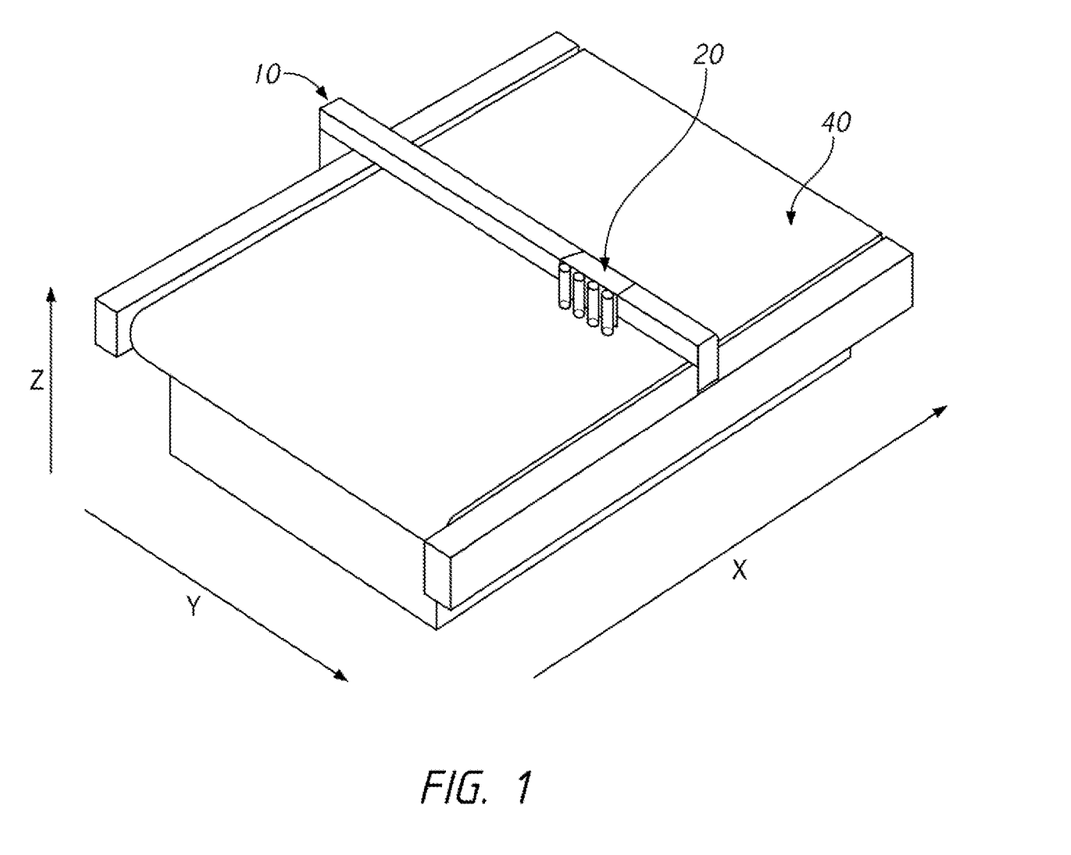
FIG. 1 is a schematic diagram of an embodiment of the printing system of the invention.

FIG. 1 is a schematic diagram of a non-limiting embodiment of the printing system of the invention. The system features table 40 which is adapted to receive a printable substrate and traversed by bridge 10. In some aspects, table 40 is a digital flatbed cutter. Bridge 10 is operably connected to carriage 20 in a manner that permits carriage 20 to navigate at least a portion of the length of bridge 10 such that carriage 20 moves over the surface of table 40 along a y-axis with respect to table 40. Carriage 20 is adapted to house one or more carriage elements as disclosed herein. Bridge 10 can be connected to table 40, or comprise a separate frame configured to hold bridge 10 over table 40 in a manner that permits carriage 20 to move over the surface of table 40. Table 40 can comprise a roll feeder or conveyor belt assembly that is configured to move a printable substrate along an x-axis with respect table 40. Table 40 can be a cutter or flatbed plotter. Suitable plotters for use with the invention include, but are not limited to, a Zund plotter manufactured by Zund Systemechnik AG™, a Wild™ plotter, or Esko Kongsberg™ plotter, for example.

Figure 2:
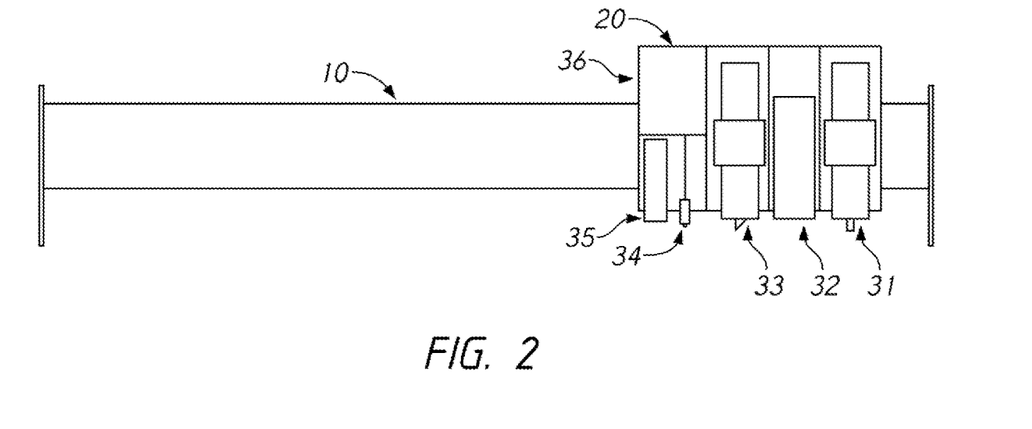
FIG. 2 is a schematic diagram of carriage elements of an embodiment of the printing system of the invention.

FIG. 2 is a schematic drawing of bridge 10 in mechanical connection with carriage 20. Carriage 20 is connected to bridge 10 in a manner that permits carriage 10 to navigate bridge 10 along a longitudinal axis of bridge 10 under the power of an electronic motor, for example, which can be housed within bridge 10 carriage 20. In other aspects, carriage 20 is in mechanical communication with a motor housed externally from bridge 10 and carriage 20, wherein carriage 20 is in mechanical communication with the motor through belts and pulleys adapted to move carriage 20 along the longitudinal axis of bridge 10. Table 40 and bridge 10 can assume the configuration of the apparatus disclosed in U.S. Publication No. 2005/0247173, the entire contents of which are incorporated herein by reference for all purposes. In some aspects of the invention, table 40 is adapted to receive a large format printable substrate. For example, table 40 can be of a size that is sufficient to support at least a portion of a large format printable substrate while the large format printable substrate is acted upon, or in accordance with, the system and method of the invention.

Carriage 20 can be connected to one or more carriage elements selected from creasing tool 31, camera 32, cutting tool 33, material dispensing module 34, curing module 35, and z-axis mechanism 36. In at least one aspect of the invention, carriage 20 is connected to each of camera 32, cutting tool 33, material dispensing module 34, curing module 35, z-axis mechanism 36, and optionally creasing tool 31. Carriage 20 can be connected to two, three, four, five, or more material dispensing modules. Camera 32 is configured to detect one or more registration marks on a printable substrate and communicate with a system processor to permit the processor to instruct one or more of the remaining carriage elements to perform their respective functions according to a predetermined print product configuration. For example, the system processor can instruct material dispensing module 34 to deposit a material (e.g. a UV curable material) on the printable substrate based on camera 32's detection of at least one registration mark on the printable substrate. Camera 32 can be a sensor adapted to read one or more registration marks on a printable substrate. In at least one non-limiting embodiment, camera 32 is a CCD camera. The system processor can instruct cutting tool 33 to cut the printable substrate according to a pre-determined pattern to produce a printed product having a desired shape or configuration. As will be appreciated by one skilled in the art, UV curing module 35 can be an ultraviolet light source configured to generate an amount of ultraviolet light sufficient to cure a UV curable material that is deposited on a printable substrate by material dispensing module 34. Cutting tool 33 is adapted to cut a printable substrate to produce a finished print product having a desired shape or configuration. Suitable cutting tools for use with the invention, include, but are not limited to, blades, dies, rotary knives, angle cutters, laser cutters, oscillating tools, and routers. In some embodiments of the invention, the cutting tool is adapted to kiss-cut the printable substrate. Cutting tools for use with the invention can be those systems provided by Zund Cutting Industries™, for example. Z-axis mechanism 36 is adapted to move at least one of material dispensing module 34 and UV curing module 36 towards and away from table 40 along a z-axis with respect table 40. Z-axis mechanism 36 can comprise a controller and motor which are configured to raise and lower material dispensing module 34 (or component thereof) so as to permit the module to dispense a material to achieve a desired height for the three-dimensional feature that is desired, or to achieve a desired level of resolution. For example, z-axis mechanism 36 can move dispensing head 34.1, nozzle 34.2, heating element 34.6, and UV curing module 35 away from the surface of a printable substrate so as to permit the system to apply and cure multiple layers of a UV curable material without the layers contacting nozzle 34.2.

Figure 3:
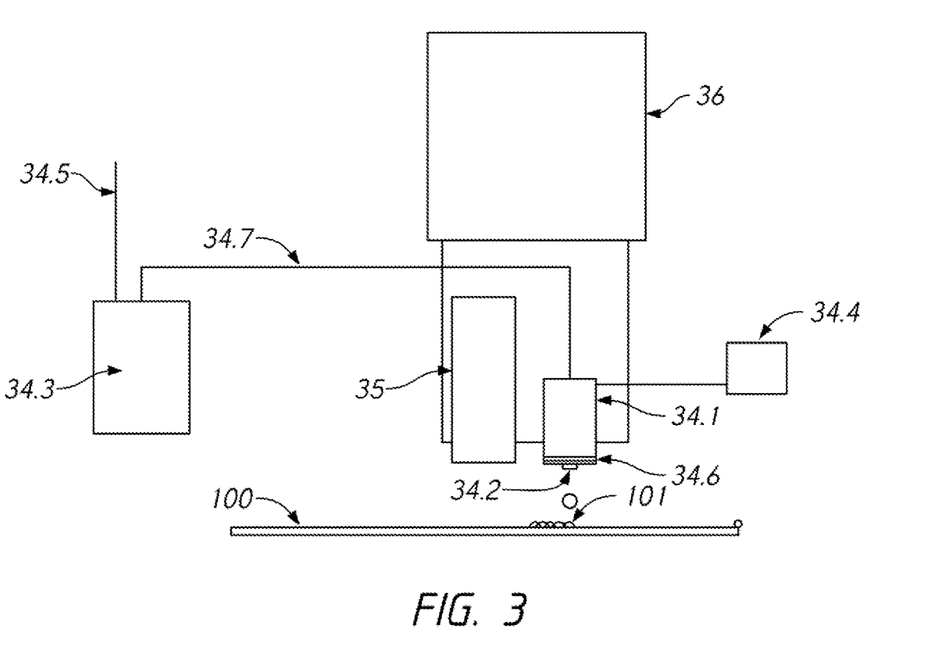
FIG. 3 is a schematic diagram of a material dispensing module of the system of the invention including associated components.

In some embodiments of the invention, material dispensing module 34 is a non-contact micro-dispensing jet valve. The micro-dispensing jet valve can be adapted to dispense droplets of material in a size between about 0.5 nl and about 5,000 nl. The micro-dispensing jet valve can be adapted to dispense a high viscosity material. By dispensing high viscosity materials, the micro-dispensing jet valve permits the system to provide print products having significantly raised three-dimensional features. The micro-dispensing jet valve for use with the system and method disclosed herein can be adapted to dispense materials having a viscosity of at least about 150 millipascal seconds, at least about 200 millipascal seconds, at least about 250 millipascal seconds, at least about 300 millipascal seconds, at least about 350 millipascal seconds, at least about 400 millipascal seconds, at least about 450 millipascal seconds, or at least about 500 millipascal seconds. In some aspects, the micro-dispensing jet valve for use with the system and method disclosed herein is adapted to dispense materials having a viscosity that is between about 150 millipascal seconds and about 5,000 millipascal seconds, between about 200 millipascal seconds and about 5,000 millipascal seconds, between about 250 millipascal seconds and about 5,000 millipascal seconds, between about 300 millipascal seconds and about 5,000 millipascal seconds, between about 350 millipascal seconds and about 5,000 millipascal seconds, between about 400 millipascal seconds and about 5,000 millipascal seconds, between about 450 millipascal seconds and about 5,000 millipascal seconds, between about 500 millipascal seconds and about 5,000 millipascal seconds, between about 1,000 millipascal seconds and about 5,000 millipascal seconds, between about 1,500 millipascal seconds and about 5,000 millipascal seconds, between about 2,000 millipascal seconds and about 5,000 millipascal seconds, between about 2,500 millipascal seconds and about 5,000 millipascal seconds, between about 3,000 millipascal seconds and about 5,000 millipascal seconds, between about 3,500 millipascal seconds and about 5,000 millipascal seconds, between about 4,000 millipascal seconds and about 5,000 millipascal seconds, or between about 4,500 millipascal seconds and about 5,000 millipascal seconds.

Suitable micro-dispensing jet valves for use with the invention include, but are not limited to, a modular PICO Pµulse Jet Valve™ configuration available from Nordson EFD™. In other aspects, the micro-dispensing jet valve can be micro-dispensing system Model No. MDS 3280 or MDS 1560 from Vermes Microdispensing™. The micro-dispensing jet valve can be the device disclosed in US Patent Application Publication No. 2014/0291358, or the dispenser disclosed in U.S. Pat. No. 7,694,855, the entire contents of which are incorporated herein by reference for all purposes.

FIG. 3 is a schematic drawing showing a non-limiting embodiment of a material dispensing module and associated components for use with the invention. The material dispensing module can be a micro-dispensing jet valve connected to dispensing head 34.1 having a valve therein and connected to nozzle 34.2. Nozzle 34.2 can have a dispensing orifice that is between about 50 microns and about 600 microns in diameter. Nozzle 34.2 can have an orifice diameter that is about 50 microns, about 100 microns, about 150 microns, about 200 microns, about 250 microns, about 300 microns, about 350 microns, about 400 microns, about 450 microns, about 500 microns, about 550 microns, or about 600 microns. Dispensing head 34.1 and nozzle 34.2 are in fluid communication with reservoir 34.3 through feed line 34.7. In some embodiments, dispensing head 34.1 and nozzle 34.2 are connected to heating element 34.6 which is adapted to heat a material from feed line 34.7 to achieve a desired level of viscosity for dispensed material 101 which is deposited on printable substrate 100. Dispensing head 34.1 can be in electronic communication with controller 34.4 which is adapted to control the opening and closing of the valve within dispensing head 34.1 so as to regulate the open and close time of the valve and thus regulate at least one of the dispensing rate and drop size of dispensed material 101. Controller 34.4 can be in electronic communication with heating element 34.6 to control the temperature of dispensing head 34.1 and nozzle 34.2, thereby regulating the temperature and viscosity of dispensed material 101. As disclosed herein, material dispensing module 34 (including dispensing head 34.1 and nozzle 34.2) and UV curing module 35 can be in mechanical communication with z-axis mechanism 36 to permit z-axis mechanism 36 to move dispensing module 34 and UV curing module 35 toward and away from printable substrate 100.

Reservoir 34.3 is adapted to contain a material that is dispensed onto printable substrate 100 as depicted by dispensed material 101. Reservoir 34.3 can be adapted to contain a UV curable material. The UV curable material can have a high viscosity (e.g. greater than about 150 millipascal seconds). The reservoir can be a reservoir produced by Fisnar™, including, without limitation, the following model numbers: IJ2601 N-55-SP; IJ2601 N-55; IJ-0100; IJ-01 OOR; IJ-0200; IJ-0200R; IJ-0300; IJ-0300R; IJ-832-211; IJ-83B-500; IJ-838-500-SP; IJ-838-500-BK; IJ-83G-510-SP; FT1; FT1-AG; FT2; FT2-AG; FT5; FT5-AG; FT10; and FT10-AG. The features and specifications of these reservoirs are incorporated herein by reference for all purposes. Reservoir 34.3 can be in communication with a means for producing pressure in the reservoir, such as a compressor or source of compressed gas via pressure line 34.5. Pressure line 34.5 can include an in-line pressure regulator that is adapted to regulate the pressure within reservoir 34.3. When pressurized, reservoir 34.3 supplies a material for dispensing to dispensing head 34.1 though feed line 34.7. In at least one alternative embodiment, reservoir 34.3 is in fluid communication with a pump that supplies a material for dispensing to dispensing head 34.1 through feed line 34.7.

Material dispensing module 34 can be associated with UV curing module 35 which is adapted to polymerize a UV curable material dispensed through nozzle 34.2. In some embodiments, at least one of dispensing head 34.1, nozzle 34.2, heating element 34.6, and UV curing module 35 are mechanically connected to z-axis mechanism 36 so as to permit z-axis mechanism 36 to move at least one of dispensing head 34.1, nozzle 34.2, heating element 34.6, and UV curing module 35 toward and away from printable substrate 100 during the printing process in order to permit the device to provide a desired height or resolution for the three-dimensional feature being provided on printable substrate 100. It will be understood that z-axis mechanism can be in mechanical communication with a power means, such as a motor or solenoid, to power the movement of the dispensing head 34.1, nozzle 34.2, heating element 34.6, and UV curing module 35 toward and away from printable substrate 100.

In at least one embodiment, the invention provides a method of providing a print product having at least one three-dimensional feature thereon. The method can be practiced by providing a material dispensing module, providing a printable substrate, dispensing a UV curable material onto a surface of the printable substrate using the material dispensing module, and curing the dispensed UV curable material with ultraviolet light, wherein curing the dispensed UV curable material produces at least one three-dimensional feature that is permanently adhered to the printable substrate thereby providing a print product having at least one three-dimensional feature. The material dispensing module can be a micro-dispensing jet valve as disclosed herein. Curing the UV curable material can be accomplished by an ultraviolet light source. The method of this embodiment can be performed using a system as disclosed herein.

In some embodiments of the method, the material dispensing module dispenses a material that is an adhesive that is then contacted with a texture providing material, such as glitter, glass, plastic, or metallic particles (e.g. colored glass, colored metallic, or colored plastic particles), or a phosphorescent powder, for example. In some aspects, the material dispensing module dispenses the adhesive and texture providing material as a mixture. The adhesive can be an adhesive that is cured without the application of ultraviolet light, such as by exposure to air, for example.

In some embodiments, the dispensing and curing steps are performed simultaneously. The dispensing and curing steps can be performed simultaneously in one, two, three, four, five or more applications. For example, the method can comprise a first application wherein the UV curable material is dispensed and cured in a first application, and the dispensing and curing steps are repeated over the previously dispensed and cured UV curable material thereby providing a three-dimensional feature comprising a plurality of layers.

In other embodiments, the UV curable material is dispensed in multiple layers and then cured with ultraviolet light to provide a three-dimensional feature comprising a plurality of layers.

The method and system of the invention can be used to provide three-dimensional features on a wide range of printable substrates. The printable substrate can be a flat, planar object or medium. The printable substrate for use with the invention can be a material selected from fabric (e.g. cloth and canvas), foam, cardboard, paper, glass, fiberglass, plastic, corrugated carton, wood, metal (e.g. aluminum), acrylic, vinyl (e.g. PVC, PP, and PET), and combinations thereof. In some aspects of the invention, the printable substrate is a large format print product. Non-limiting examples of large format print products include, but are not limited to: wrappings; boxes, bags, and other packaging; decals and magnets for vehicles (e.g. cars, trucks, buses, SUVs, and vans); wrappings for vending machines and light boxes; wall and window decals and coverings; window blinds; canvas prints and paintings; t-shirts; flags; signs (e.g. yard signs and billboards); banners; posters; point of sale displays; cut-outs; curtains; sofa covers; table cloths; wood furniture; and wood decorations. In some aspects, the system and method are used to provide three-dimensional features on a non-large format printed product, such as, for example, keychains, business cards, pins, decals, letterhead, envelopes, phone cases, and promotional articles.

In some aspects of the invention, the printable substrate is pre-printed with printed matter such as text, designs, or images, for example. In some aspects of the invention, at least a portion of the printed matter is used as registration marks which are used as paths for cutting, creasing, and/or dispensing a UV curable material and/or adhesive. The system and method of the invention can provide printed matter with a three-dimensional effect by overlaying at least a portion of the printed matter with a UV curable material and/or adhesive by a material dispensing module as disclosed herein.

At least one aspect of the invention concerns the three-dimensional features that are provided on the surface of the printable substrate by the system and method of the invention. The three-dimensional feature can be a raised from the surface of the printable substrate and have a height of between about 0.02 inches to about 5 inches as measured from the top of the three-dimensional feature to the surface of the printable substrate upon which a UV curable material and/or adhesive is applied. The three-dimensional feature can assume the form of images, designs, shapes, text, brail, or doming, for example. In some aspects of the invention, the three-dimensional feature comprises a plurality of domes that are selectively located on a surface of the printable substrate, or a single dome that covers all or a majority of a surface of the printable substrate. The three-dimensional feature can optionally be overlaid on matter that is pre-printed on a printable substrate.

In some aspects of the invention, the system and method dispense a UV curable material onto a printable substrate. The UV curable material can be a material having sufficient viscosity to remain raised after being dispensed on the printable substrate such that curing the dispensed UV curable material produces a three-dimensional feature on the printable substrate. The UV curable material can have a dispensing viscosity of at least about 150 millipascal seconds, at least about 200 millipascal seconds, at least about 250 millipascal seconds, at least about 300 millipascal seconds, at least about 350 millipascal seconds, at least about 400 millipascal seconds, at least about 450 millipascal seconds, or at least about 500 millipascal seconds. In some aspects, the UV curable material has a viscosity that is between about 150 millipascal seconds and about 5,000 millipascal seconds, between about 200 millipascal seconds and about 5,000 millipascal seconds, between about 250 millipascal seconds and about 5,000 millipascal seconds, between about 300 millipascal seconds and about 5,000 millipascal seconds, between about 350 millipascal seconds and about 5,000 millipascal seconds, between about 400 millipascal seconds and about 5,000 millipascal seconds, between about 450 millipascal seconds and about 5,000 millipascal seconds, between about 500 millipascal seconds and about 5,000 millipascal seconds, between about 1,000 millipascal seconds and about 5,000 millipascal seconds, between about 1,500 millipascal seconds and about 5,000 millipascal seconds, between about 2,000 millipascal seconds and about 5,000 millipascal seconds, between about 2,500 millipascal seconds and about 5,000 millipascal seconds, between about 3,000 millipascal seconds and about 5,000 millipascal seconds, between about 3,500 millipascal seconds and about 5,000 millipascal seconds, between about 4,000 millipascal seconds and about 5,000 millipascal seconds, or between about 4,500 millipascal seconds and about 5,000 millipascal seconds. In some aspects, the UV curable material is heated by the micro-dispensing jet valve nozzle, head, reservoir, or combination thereof, to achieve the viscosities disclosed herein. The UV curable material can be combined with a rheology modifier to achieve the viscosities disclosed herein.

The UV curable material can comprise any material known in the art that is capable of being cured by UV-light to permanently adhere to the surface of a printable substrate to which the material is applied. Non-limiting examples of the UV curable material include, but are not limited to, polyethers, polyurethanes, acryls, epoxides, epoxies, silicones, polyesters, or combinations thereof. The UV curable material can be an acrylate monomer with one, two, three or more acrylic group. The UV curable material can be an acrylate oligomer, such as an epoxy acrylate or a urethane acrylate, or an aliphatic urethane acrylate, for example. The UV curable material can be combined with a curable oligomer, a reactive diluent, a curing agent, an epoxy catalyst, a UV sensitive photoinitiator, an amine synergist, a rheology modifier, a performance improving additive, or combinations thereof. Non-limiting examples of these materials are disclosed in U.S. Pat. No. 9,216,543, the entire contents of which are incorporated herein by reference for all purposes. The UV curable material can be an aliphatic urethane acrylate, such as, for example, Catalog No. UV 60-7180 or Catalog No. UV 60-7185 available from Epoxies Etc., Inc.

The UV curable material can be colored and opaque or clear. For example, the UV curable material can be mixed with color pigments, including, without limitation, metallic pigments. The UV curable material can be combined with particles to enhance the three-dimensional effects of material. For example, the UV curable material can be combined with glitter, glass particles, metallic particles, or plastic particles (e.g. colored glass, metallic, or plastic particles), or a phosphorescent powder. The UV curable material can be combined with an adhesive. In some embodiments, the method of the invention comprises cutting a print product. Such cutting can take place before or after a three-dimensional feature is provided onto the printable substrate. The print product can be cut by means of a blade, die, rotary knife, angle cutter, laser cutter, oscillating tool, or router. Cutting the print product can comprise cutting a large format print product using a system as disclosed herein.

Figure 4:
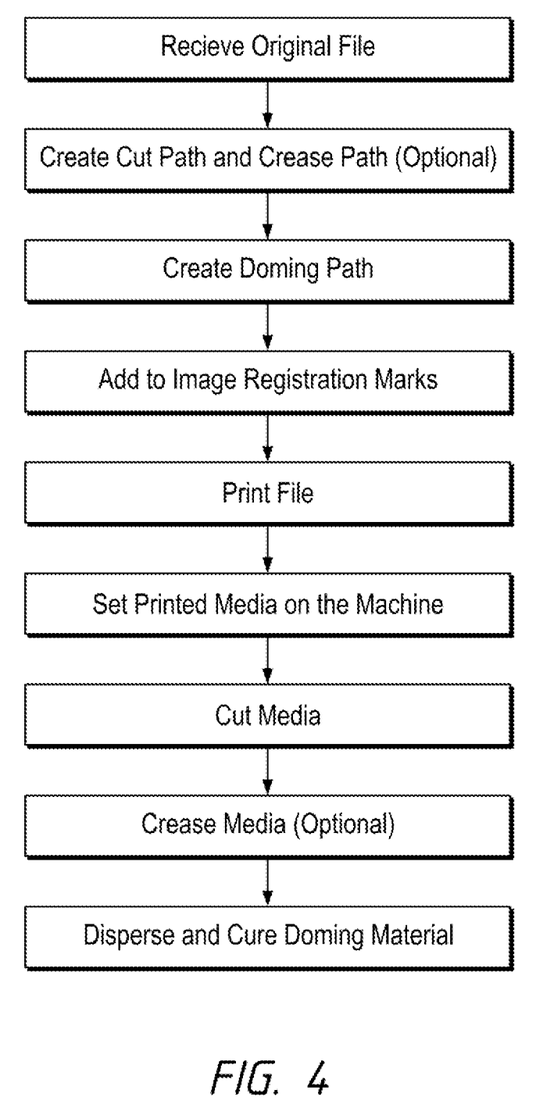
FIG. 4 is a flow chart of a process of the invention.

FIG. 4 is flow chart of the steps of a non-limiting embodiment of a method of using a system of the invention to produce a print product having one or more three-dimensional features. The method begins with a receiving step wherein a computer file encoding a desired print product is uploaded to the system of the invention. The computer file can provide the dimensions for the print product, the three-dimensional features that are desired, and optionally a creasing configuration for the product. A processor within the system reads the file and creates one or more cut paths, and optionally one or more crease paths, by which the print product will be cut and optionally creased. The processor then creates a path (i.e. doming path) by which a UV curable material (and/or adhesive) will be dispensed to provide a desired one or more three-dimensional features on the print product. The processor then creates and identifies one or more image registration marks to be used to guide the cutting, dispensing, and optional creasing steps to be performed by the system. The file is then read to execute instructions to print printed matter onto a printable substrate to provide a printed media. In some aspects, the printed matter is printed onto the printable substrate via an external print system. The printable substrate is then processed by the system of the invention whereupon the system cuts the printed media, optionally creases the printed media according to the paths created by the processor in the preceding steps. The system of the invention then dispenses and cures a UV curable material (i.e. doming material) on a surface of the printable substrate thereby providing a print product having at least one three-dimensional feature and a desired product configuration.

A non-limiting embodiment of the method of the invention is practiced by providing a system comprising (i) a table adapted to receive and move a print product along an x-axis with respect to said table, (ii) a bridge traversing the table along a y-axis with respect to said table, (iii) a carriage adapted to navigate the bridge, wherein the carriage is connected to one or more carriage elements that include a cutting tool, a camera, a UV curing module, and at least one material dispensing module, and (iv) a processor adapted to read an image file and execute instruction to operate the components of the system. A printable substrate having at least one registration mark is then placed on the table, after which the processor executes instructions to activate the table to move the printable substrate along the table, and move the carriage along the bridge, so as to permit the camera to detect registration marks on the printable substrate and provide feedback to the processor to permit the processor to determine the position of the carriage elements. Upon determining the position the carriage elements relative to the printable substrate, the processor reads the image file for the desired print product configuration and executes (v) instructions to the material dispensing module to dispense a UV curable material onto the upward facing surface of the printable substrate according to the image file, and (vi) instructions to the UV-curing module to illuminate the dispensed material with ultraviolet light so as to cure the material such that the dispensed material permanently adheres to the printable substrate to provide a print product having one or more three-dimensional features on the printable substrate's upward facing surface. In some aspects, the printable substrate contains printed matter on its surface and the UV curable material is dispensed on at least a portion of the printed matter. The processor can then execute instructions to move the print product on the table, and the carriage along the bridge, to permit the camera to detect registration marks and provide feedback to the processor regarding the position of the cutting tool whereupon the cutting tool executes instructions to the cutting tool to cut the print product according to the image file. In some embodiments of the method, the dispensing and curing steps are performed after the cutting steps. It will be understood that the material dispensing module can be a micro-dispensing jet valve as disclosed herein. It will further be understood that the print product can be a large format print product.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

REFERENCE CHARACTERS

10—Bridge
20—Carriage
40—Table
31—Creasing tool
32—Camera
33—Cutting tool
34—Material dispensing module
34.1—Dispensing head
34.2—Dispensing module nozzle
34.3—Reservoir
34.4—Controller
34.5—Pressure unit
34.6—Heating element
34.7—Feed line
35—UV curing module
36—Z-axis mechanism
100—Substrate
101—Dispensed material

The invention claimed is:

1. A method of making a large format print product having at least one three-dimensional feature, comprising:
   a) providing a system comprising at least one micro-dispensing jet valve;
   b) providing a large format printable substrate; and
   c) dispensing a material onto said large format printable substrate as droplets by said at least one micro-dispensing jet valve thereby providing a large format print product having at least one three-dimensional feature thereon.

2. The method of claim 1, wherein said material permanently adheres to said large format printable substrate.

3. The method of claim 1, wherein said droplets are between about 0.5 nl and about 5,000 nl in volume.

4. The method of claim 1, wherein said material is dispensed at a viscosity of at least about 150 millipascal seconds.

5. The method of claim 1, wherein said at least one micro-dispensing jet valve comprises a nozzle having an orifice that is between about 50 microns and about 600 microns in diameter.

6. The method of claim 1, wherein said at least one micro-dispensing jet valve comprises a heating element and at least one of a nozzle and a reservoir, wherein said heating element heats at least one of said nozzle and said reservoir, thereby decreasing the viscosity of said material dispensed by said at least one micro-dispensing jet valve.

7. The method of claim 1, wherein said system comprises a plurality of micro-dispensing jet valves, and said dispensing comprises dispensing the same or different materials onto said large format printable substrate by said plurality of micro-dispensing jet valves.

8. The method of claim 1, wherein said system comprises a cutting tool and said cutting tool cuts said large format printable substrate.

9. The method of claim 1, wherein said system comprises a creasing tool and said creasing tool creases said large format printable substrate.

10. The method of claim 1, wherein said material is selected from an adhesive, a UV curable material, and a combination thereof.

11. The method of claim 10, wherein said UV curable material is selected from a polyether, a polyurethane, an acryl, an epoxide, an epoxy, a silicone, a polyester, and combinations thereof.

12. The method of claim 11, wherein said acryl is selected from an acrylic monomer, an acrylic oligomer, and a combination thereof.

13. The method of claim 11, wherein said acryl is selected from a monofunctional acryl, a difunctional acryl, a trifunctional acryl, a polyfunctional acryl, and combinations thereof.

14. The method of claim 1, wherein said material is combined with a reactive diluent, a UV sensitive photoinitiator, a rheology modifier, an epoxy catalyst, an adhesive, glitter, plastic particles, glass particles, metallic particles, color pigment, phosphorescent powder, or combinations thereof.

15. The method of claim 10, wherein (i) said at least one micro-dispensing jet valve dispenses a UV curable material onto said large format printable substrate, (ii) said system comprises a UV curing module, and (iii) said UV curing module cures said dispensed UV curable material.

16. The method of claim 1, wherein said large format printable substrate is selected from fabric, foam, cardboard, paper, glass, fiberglass, plastic, corrugated carton, wood, metal, PVC, acrylic, vinyl, and combinations thereof.

17. The method of claim 1, wherein said large format printable substrate has printed matter thereon and said material is dispensed onto at least a portion of said printed matter thereby providing said portion with at least one three-dimensional feature.

18. The method of claim 1, wherein said at least one three-dimensional feature includes at least one domed feature.

19. The method of claim 1, wherein said at least one three-dimensional feature is between about 0.02 inches and about 5 inches in height as measured from the surface of said large format print product.

20. The method of claim 10, wherein said material comprises a UV curable material and color pigment.

* * * * *